US006257542B1

(12) United States Patent
Westfield et al.

(10) Patent No.: US 6,257,542 B1
(45) Date of Patent: Jul. 10, 2001

(54) THEFT PREVENTION CLAMP

(76) Inventors: Lawrence P. Westfield, P.O. Box 4398, Vero Beach, FL (US) 32964; Mark J. Westfield, 412 Gibbon St., Alexandria, VA (US) 22314

( * ) Notice: Subject to any disclaimer, the term of this patent is extended or adjusted under 35 U.S.C. 154(b) by 0 days.

(21) Appl. No.: 09/386,420

(22) Filed: Aug. 31, 1999

Related U.S. Application Data

(60) Provisional application No. 60/119,175, filed on Feb. 8, 1999.

(51) Int. Cl.[7] .......... F16M 13/00

(52) U.S. Cl. .......... 248/551; 248/553

(58) Field of Search .......... 248/205.3, 551, 248/552, 553, 680, 918; 70/58

(56) References Cited

U.S. PATENT DOCUMENTS

| | | | | |
|---|---|---|---|---|
| D. 334,921 | | 4/1993 | Basara et al. | D14/114 |
| 4,696,449 | * | 9/1987 | Woo et al. | 248/553 |
| 5,076,079 | | 12/1991 | Monoson et al. | 70/58 |
| 5,135,197 | | 8/1992 | Kelly et al. | 248/551 |
| 5,228,658 | | 7/1993 | Kelly | 248/551 |
| 5,322,255 | * | 6/1994 | Garrett | 248/918 X |
| 5,501,086 | * | 3/1996 | Sherlock | 70/58 |
| 5,502,989 | * | 4/1996 | Murray, Jr. et al. | 70/58 |
| 5,595,074 | | 1/1997 | Munro | 70/58 |
| 5,645,261 | * | 7/1997 | Glynn | 248/551 |
| 5,692,722 | * | 12/1997 | Lundagards | 248/553 |
| 5,725,194 | | 3/1998 | Glynn | 248/551 |
| 5,730,009 | | 3/1998 | Westfield | 70/63 |
| 5,921,523 | * | 7/1999 | South et al. | 248/551 |

FOREIGN PATENT DOCUMENTS

| | | |
|---|---|---|
| 2134587 | 8/1984 | (GB) . |
| 2153002 | 8/1985 | (GB) . |

* cited by examiner

*Primary Examiner*—Daniel P. Stodola
*Assistant Examiner*—Curtis A. Cohen
(74) *Attorney, Agent, or Firm*—Richard C. Litman

(57) ABSTRACT

A theft prevention clamp for preventing the theft of an article from a support. The theft prevention clamp is designed to removably fasten the article to a support, such as a desk top, a desk leg, a table, or any other similarly shaped object. The theft prevention clamp has three rigid portions including two rigid portions interconnected by a third rigid portion. The theft prevention clamp may be rigidly configured in the form of one unitary member, wherein two rigid portions are parallel to one another and are interconnected by a perpendicularly oriented third rigid portion. The theft prevention clamp may also be configured in the form of three rigid portions interconnected by elements which bias the three rigid portions in a substantially flat orientation. The theft prevention clamp may also include a fourth rigid portion which is intended to be mounted in or on the article to be protected. The theft prevention clamp includes a plurality of fastening elements for fastening the clamp to the article to be protected and for securely fastening the clamp to the support.

17 Claims, 13 Drawing Sheets

THEFT PREVENTION CLAMP

CROSS-REFERENCE TO RELATED APPLICATION

This application claims the benefit of U.S. Provisional patent application Ser. No. 60/119,175, filed Feb. 8, 1999.

BACKGROUND OF THE INVENTION

1. Field of the Invention

The present invention relates to a theft prevention clamp for preventing the theft of an article from a support, such as a computer or piece of equipment from a desk surface.

2. Description of the Prior Art

Laptop and personal computers (both desktop CPUs and towers), and other equipment (such as printers, scanners, fax machines, TVs, VCRs, medical and other equipment) are frequently stolen when briefly left unattended, especially in public places, such as an office or a library. There is a need for a means to temporarily or permanently secure such devices, without risk of damage to the equipment, or a desk, table, shelf or other furniture to which it is attached, being increased by the means used to secure it. This need is not met in the prior art by a means equivalent to the present invention, which is a device by which an article may be conveniently clamped to a support.

The related art is represented by the following patents of interest.

U.S. Design Pat. No. 334,921, issued on Apr. 23, 1993 to Michael Basara et al., shows an ornamental design for a desktop computer system support device with integrated cable management. Basara et al. do not suggest a theft prevention clamp according to the claimed invention.

U.S. Pat. No. 5,076,079, issued on Dec. 31, 1991 to David B. Monoson et al., describes an anti-theft device for computers. Monoson et al. do not suggest a theft prevention clamp according to the claimed invention.

U.S. Pat. No. 5,135,197, issued on Aug. 4, 1992 to Donald W. Kelly et al., describes a base and cover member for releasably securing equipment to a horizontal or vertical surface. Kelly et al. do not suggest a theft prevention clamp according to the claimed invention.

U.S. Pat. No. 5,228,658, issued on Jul. 20, 1993 to Donald W. Kelly, describes an equipment security apparatus for removably locking equipment to a surface. Kelly does not suggest a theft prevention clamp according to the claimed invention.

U.S. Pat. No. 5,595,074, issued on Jan. 21, 1997 to Robert G. Munro, describes a desktop security locking station for a laptop computer or similarly sized computer peripheral. Munro does not suggest a theft prevention clamp according to the claimed invention.

U.S. Pat. No. 5,725,194, issued on Mar. 10, 1998 to Kenneth P. Glynn, describes a computer component securing device which has a main housing having a storage portion and a pair of table securing portions, a positioning means, a locking means, and a table securing means. Glynn does not suggest a theft prevention clamp according to the claimed invention.

U.S. Pat. No. 5,730,009, issued on Mar. 24, 1998 to Mark J. Westfield, describes a carrying case with a roll-up theft prevention clamp. Westfield does not suggest a theft prevention clamp according to the claimed invention.

Great Britain Patent document 2,134,587, published on Aug. 15, 1984, describes a security device for securing an article to a support. Great Britain '587 does not suggest a theft prevention clamp according to the claimed invention.

Great Britain Patent document 2,153,002, published on Aug. 14, 1985, describes a mount for an easily portable article that can cheaply and effectively prevent or deter theft of such an article. Great Britain '002 does not suggest a theft prevention clamp according to the claimed invention.

None of the above inventions and patents, taken either singly or in combination, is seen to describe the instant invention as claimed.

SUMMARY OF THE INVENTION

The present invention is a theft prevention clamp for preventing the theft of an article from a support. The theft prevention clamp is designed to removably fasten the article to support, such as a desk top, a desk leg, a table top, a table leg, or any other similarly shaped object. A first type of theft prevention clamp has three rigid portions including two rigid portions interconnected by a third rigid portion. Preferably, the three rigid portions are formed from material such as plastic, firm rubber, metal, or the like.

The theft prevention clamp may be rigidly configured in the form of one unitary member, wherein two rigid portions are parallel to one another and are interconnected by a perpendicularly oriented third rigid portion. The theft prevention clamp may also be configured in the form of three rigid portions interconnected by elements which bias the three rigid portions in a substantially flat orientation. Such elements may be well known springs or hinges or the like. Preferably, the lower rigid portion additionally includes at least one passage hole to enable a user to pass a security cable through the hole, thereby enabling the user to protectively secure an article to the theft prevention clamp. The upper rigid portion may additionally include a threaded passage hole to enable the user to utilize the article in an upright position via a threaded support means when the clamp is not being employed to secure an article to a support.

The first type of theft prevention clamp preferably includes a plurality of fastening elements for fastening the clamp to the article to be protected and for securely fastening the clamp to the support. The fastening elements for fastening the clamp to the article may include a plurality of threaded elements, such as short screws, bolts, or the like, for securing the clamp directly to the article to be protected. The fastening elements for fastening the clamp to the article may alternatively include a plurality of threaded elements, such as short screws, bolts, or the like, and an equal plurality of threaded receivers or pads. The threaded elements are used to secure the threaded receivers or pads to the clamp. When the receivers or pads are secured to the clamp, fastening material, such as epoxy glue or the like, is poured onto the top of each threaded receiver or pad. These threaded receivers or pads are then secured to the article to be protected. Such fastening elements for fastening the clamp to the article may be eliminated by merely applying fastening material, such as epoxy glue or the like, directly to the top of the clamp and then securing the clamp to the article to be protected. The fastening elements for securely fastening the clamp to the support include threaded bolt means, threaded nut means, and sleeve means. Each threaded bolt means has a head which is configured to fit within the sleeve means with a minimum amount of passageway between the threaded bolt means and the sleeve means. The head of the threaded bolt means includes a particular securement means indentation for cooperation with an appropriately configured releasing tool or key element.

A second type of the theft prevention clamp is substantially the same as the first type of theft prevention clamp described above, but additionally includes a fourth rigid portion which is intended to be mounted in or on the article to be protected. The second type of theft prevention clamp includes a plurality of fastening elements for fastening the clamp to the article to be protected and for securely fastening the clamp to the support. The fastening elements for fastening the clamp to the article include a plurality of threaded elements, such as screws, bolts, or the like. These fastening elements fasten the clamp to the article to be protected by passing them through holes in the upper rigid portion of the clamp and threading them through threaded holes in the fourth rigid portion. The fastening elements for securely fastening the clamp to the support include threaded bolt means, threaded nut means, and sleeve means. Each threaded bolt means has a head which is configured to fit within the sleeve means with a minimum amount of passageway between the threaded bolt means and the sleeve means. The head of the threaded bolt means includes a particular securement means indentation for cooperation with an appropriately configured releasing tool or key element.

A third type of the theft prevention clamp includes three rigid portions configured in the same manner as described above. The third type of theft prevention clamp includes a plurality of fastening elements for fastening the clamp to the article to be protected and for securely fastening the clamp to the support. The fastening elements for fastening the clamp to the article may include a plurality of threaded elements, such as short screws bolts, or the like, for securing the clamp directly to the article to be protected. The fastening elements for fastening the clamp to the article may alternatively include a plurality of threaded elements, such as short screws, bolts, or the like, and an equal plurality of threaded receivers or pads. The threaded elements are used to secure the threaded receivers or pads to the clamp. When the receivers or pads are secured to the clamp, fastening material, such as epoxy glue or the like, is poured onto the top of each threaded receiver or pad. These threaded receivers or pads are then secured to the article to be protected. Such fastening elements for fastening the clamp to the article may be eliminated by merely applying fastening material, such as epoxy glue or the like, directly to the top of the clamp and then securing the clamp to the article to be protected. The fastening elements for securely fastening the clamp to the support include threaded bolt means, threaded nut means, and sleeve means. Each threaded bolt means has a head which is configured to fit within the sleeve means with a minimum amount of passageway between the threaded bolt means and the sleeve means. The head of the threaded bolt means includes a particular securement means indentation for cooperation with an appropriately configured releasing tool or key element.

A fourth type of the theft prevention clamp includes three rigid portions in the same manner as described above. The fourth type of theft prevention clamp includes a plurality of fastening elements for fastening the clamp to the article to be protected and for securely fastening the clamp to the support. The fastening elements for fastening the clamp to the article may include a plurality of threaded elements, such as short screws, bolts, or the like, for securing the clamp directly to the article to be protected. The fastening elements for fastening the clamp to the article may alternatively include a plurality of threaded elements, such as short screws or the like, and an equal plurality of threaded receivers or pads. The threaded elements are used to secure the threaded receivers or pads to the clamp. When the receivers or pads are secured to the clamp, fastening material, such as epoxy glue or the like, is poured onto the top of each threaded receiver or pad. These threaded receivers or pads are then secured to the article to be protected. Such fastening elements for fastening the clamp to the article may be eliminated by merely applying fastening material, such as epoxy glue or the like, directly to the top of the clamp and then securing the clamp to the article to be protected.

The fastening elements for securely fastening the clamp to the support may include threaded bolt means, threaded nut means, and sleeve means, as described above. However, the fastening elements may alternatively include threaded members, bar means, lock means, and key means. Each threaded member has a head which includes a passage hole enabling passage of the bar means. The user securely attaches the clamp to the support by rotating the head of each threaded member until securement is obtained. The user then orients the holes of each threaded member to enable passage of the bar means through each hole. Once the bar means is passed through each hole, the user applies lock means through a hole at the end of the bar means and locks the lock means, thereby precluding unauthorized release of the theft prevention clamp from the support. Authorized release of the theft prevention clamp from the support occurs via release of the lock means from the bar means via key means.

Accordingly, it is a principal object of the invention to provide a theft prevention clamp for preventing the theft of an article from a support.

It is another object of the invention to provide a theft prevention clamp for preventing the theft of an article from a support that will not cause damage to the article or the support to which it is attached.

It is a further object of the invention to provide a theft prevention clamp which may be easily disengaged by the user when not needed.

It is an object of the invention to provide improved elements and arrangements thereof in a theft prevention clamp for the purposes described which is inexpensive, dependable and effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
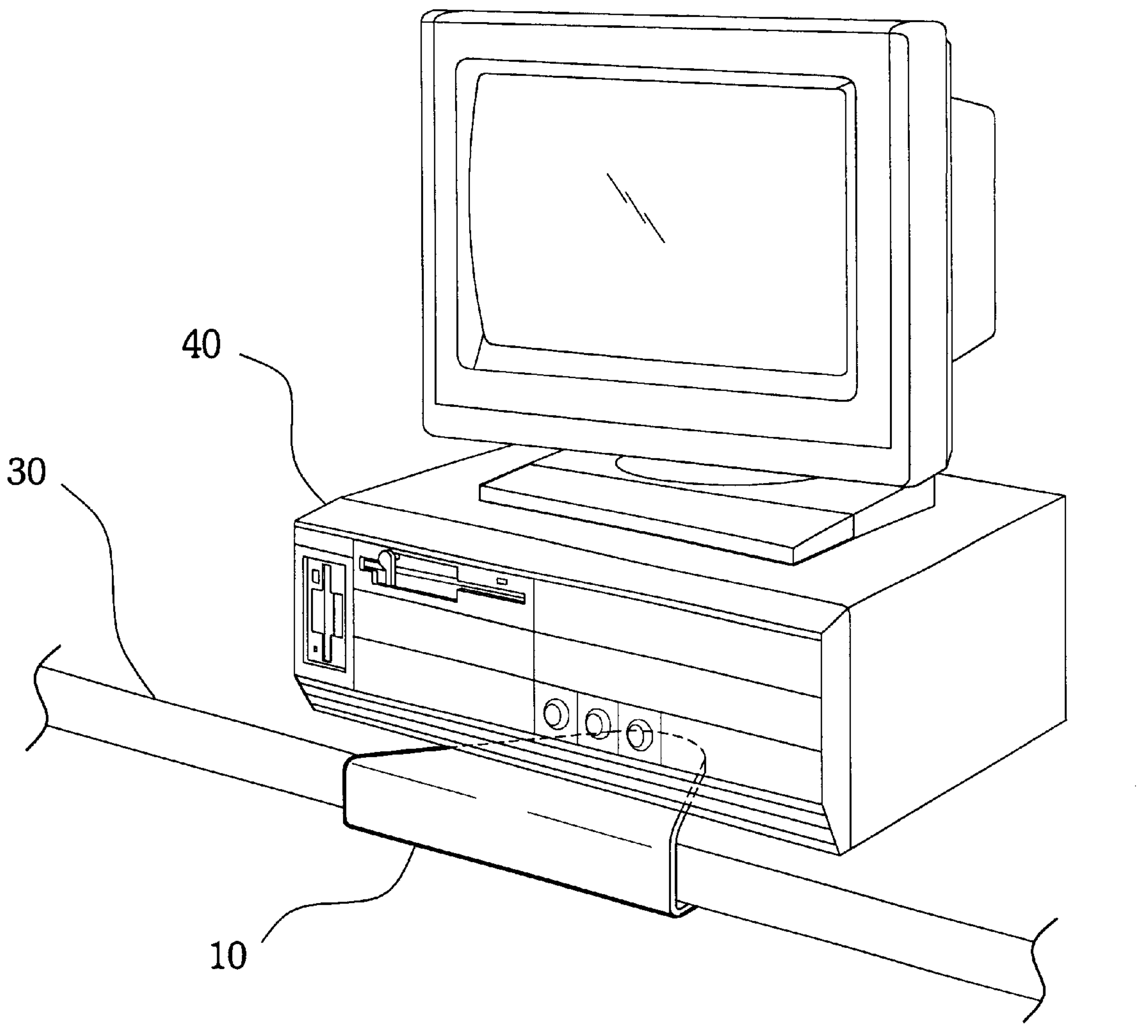
FIG. 1 is an environmental perspective view of a theft clamping device according to the invention in use with a support an article.

The present invention is a theft prevention clamp for preventing the theft of an article from a support. A theft prevention clamp constructed in accordance with the embodiments shown in FIGS. 1–4 is shown generally by reference character 10. The first type of theft prevention clamp 10 is designed to removably fasten the article 40 to a support 30, such as a desk top, a desk leg, a table top, a table leg, or any other similarly shaped object. The theft prevention clamp 10 has three rigid portions including two rigid portions interconnected by a third rigid portion. Preferably, the three rigid portions are formed from material such as plastic, firm rubber, metal, or the like.

The theft prevention clamp 10 may be rigidly configured in the form of one unitary member, wherein two rigid portions 12,14 are parallel to one another and are interconnected by a perpendicularly oriented third rigid portion. The theft prevention clamp 10 may also be configured in the form of three rigid portions interconnected by elements which bias the three rigid portions in a substantially flat orientation. Such elements (not shown) may be well known springs or hinges or the like. Preferably, the lower rigid portion 14 additionally includes at least one passage hole 13 to enable a user to pass a security cable (not shown) through the hole 13, thereby enabling the user to protectively secure the article 40 to the theft prevention clamp 10. In addition, the upper rigid portion 12 may additionally include a threaded passage hole 19 to enable the user to utilize the article 40 in an upright position via a threaded support means 23 when the clamp 10 is not being employed to secure the article 40 to the support 30.

Figure 2:
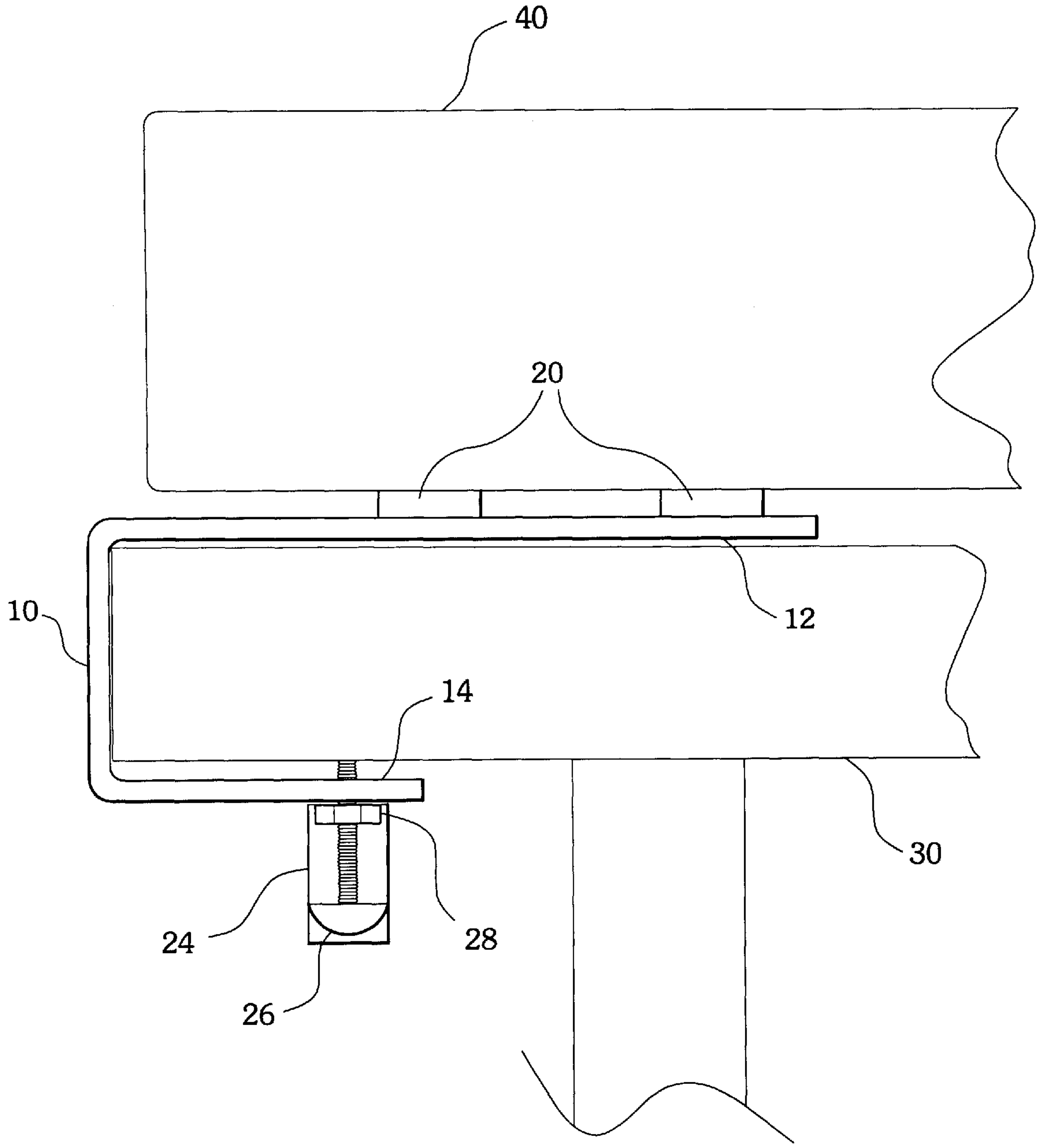
FIG. 2 is a side view of the theft clamping device shown in FIG. 1.
Figure 3:
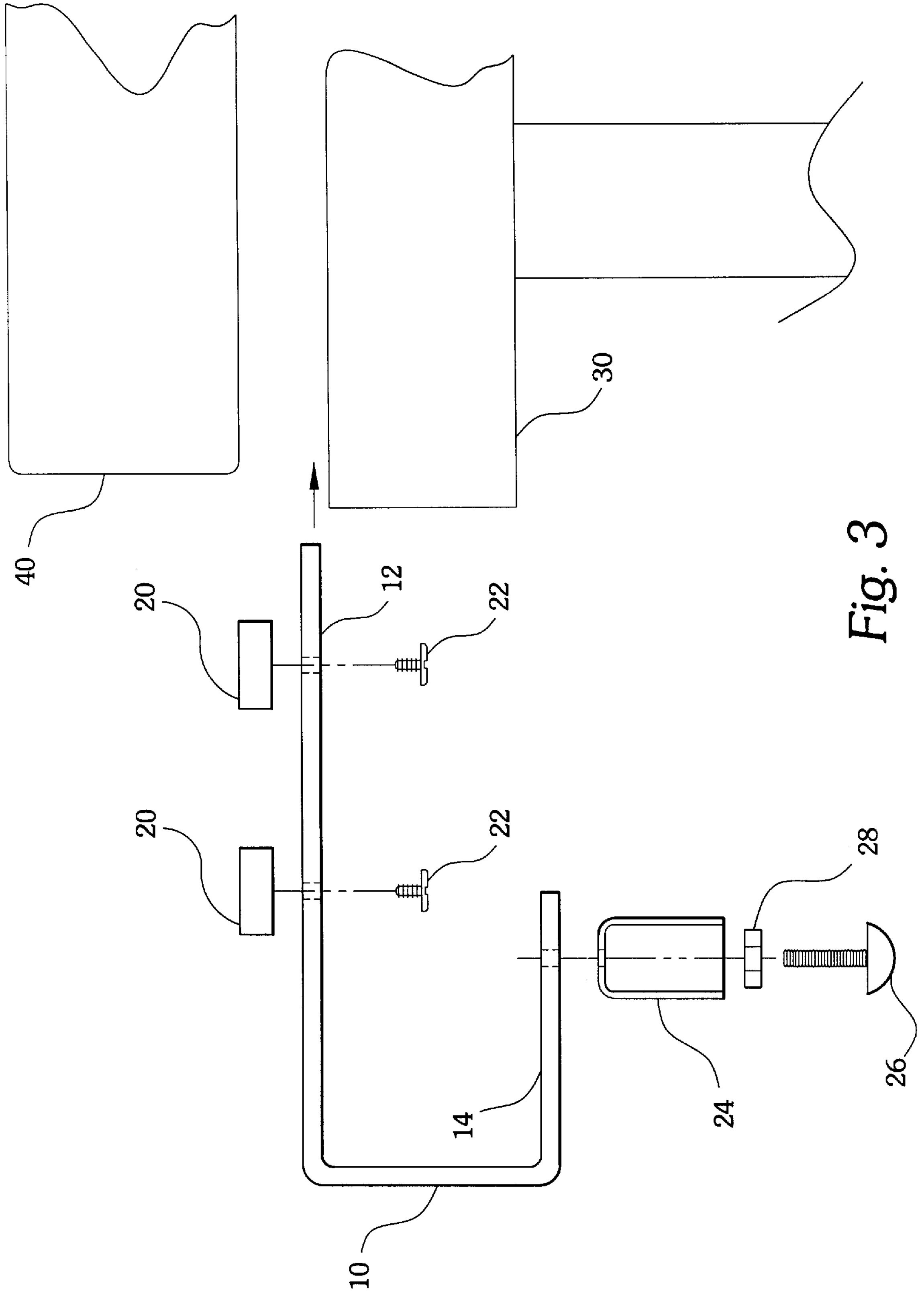
FIG. 3 is an exploded side view of the theft clamping device shown in FIG. 1.
Figure 4:
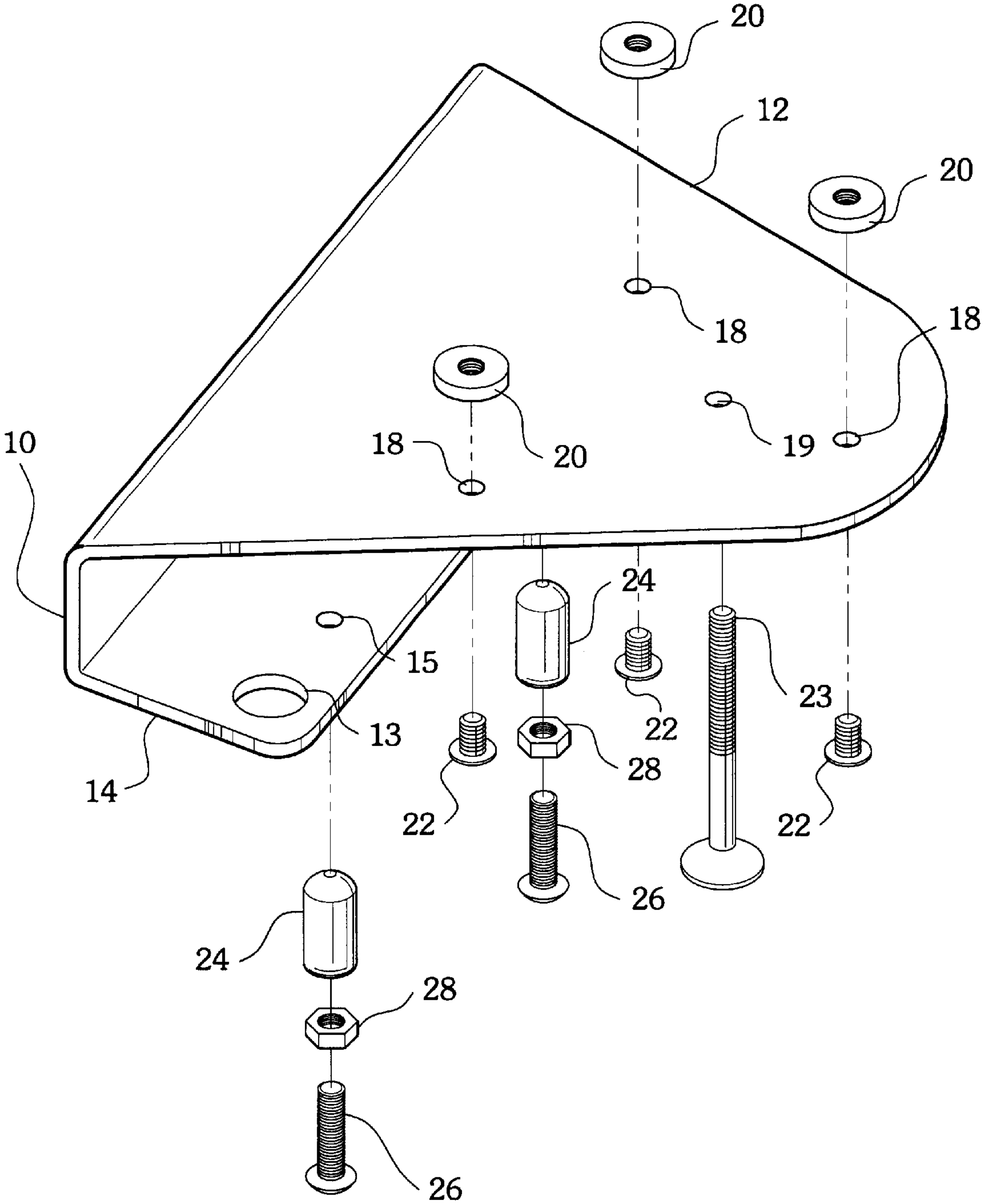
FIG. 4 is an exploded top perspective view of the theft clamping device shown in FIG. 1.

As shown in FIGS. 2–4, the first type of theft prevention clamp 10 preferably includes a plurality of fastening elements for fastening the clamp 10 to the article 40 to be protected and for securely fastening the clamp 10 to the support 30. The fastening elements for fastening the clamp 10 to the article 40 may include a plurality of threaded elements, such as short screws, bolts, or the like, for securing the clamp 10 directly to the article to be protected. The fastening elements for fastening the clamp 10 to the article 40 may alternatively include a plurality of threaded elements 22, such as short screws, bolts, or the like, and an equal plurality of threaded receivers or pads 20. The threaded elements 22 are used to secure the threaded receivers or pads 22 to the clamp 10. When the receivers or pads 20 are secured to the clamp 10, fastening material, such as epoxy glue or the like, is poured onto the top of each threaded receiver or pad 20. These threaded receivers or pads 20 are then secured to the article 40 to be protected. Such fastening elements for fastening the clamp 10 to the article 40 may be eliminated by merely applying fastening material, such as epoxy glue or the like, directly to the top of the clamp 10 and then securing the clamp 10 to the article to be protected. The fastening elements for securely fastening the clamp 10 to the support 30 include threaded bolt means 26, threaded, nut means 28, and sleeve means 24. Each threaded bolt means 26 has a head which is configured to fit within the sleeve means 24 with a minimum amount of passageway between the threaded bolt means 26 and the sleeve means 24. The head of the threaded bolt means 26 includes a particular securement means indentation for cooperation with an appropriately configured releasing tool or key element (not shown).

Figure 5:
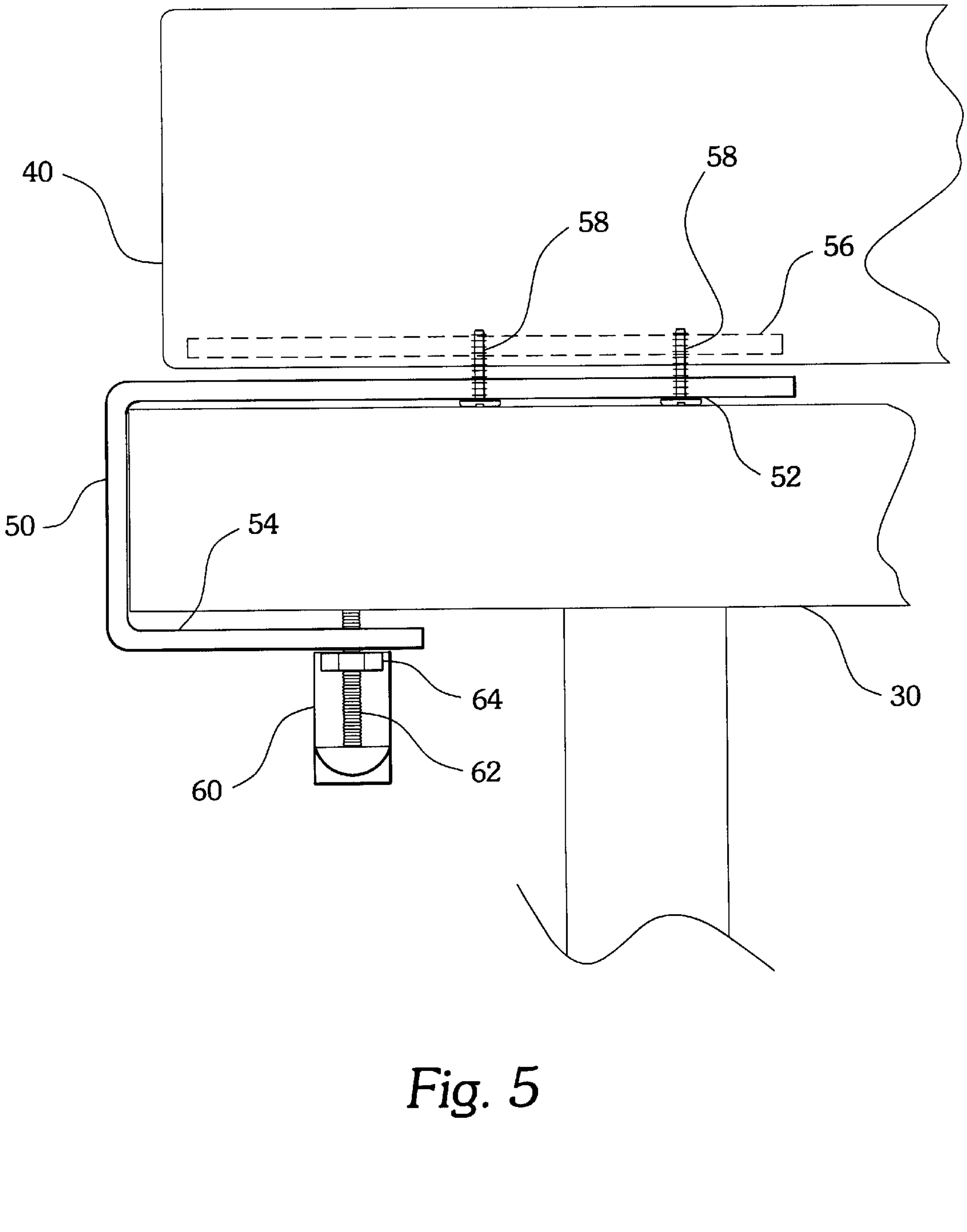
FIG. 5 is a side view of a second type of theft clamping device.
Figure 6:
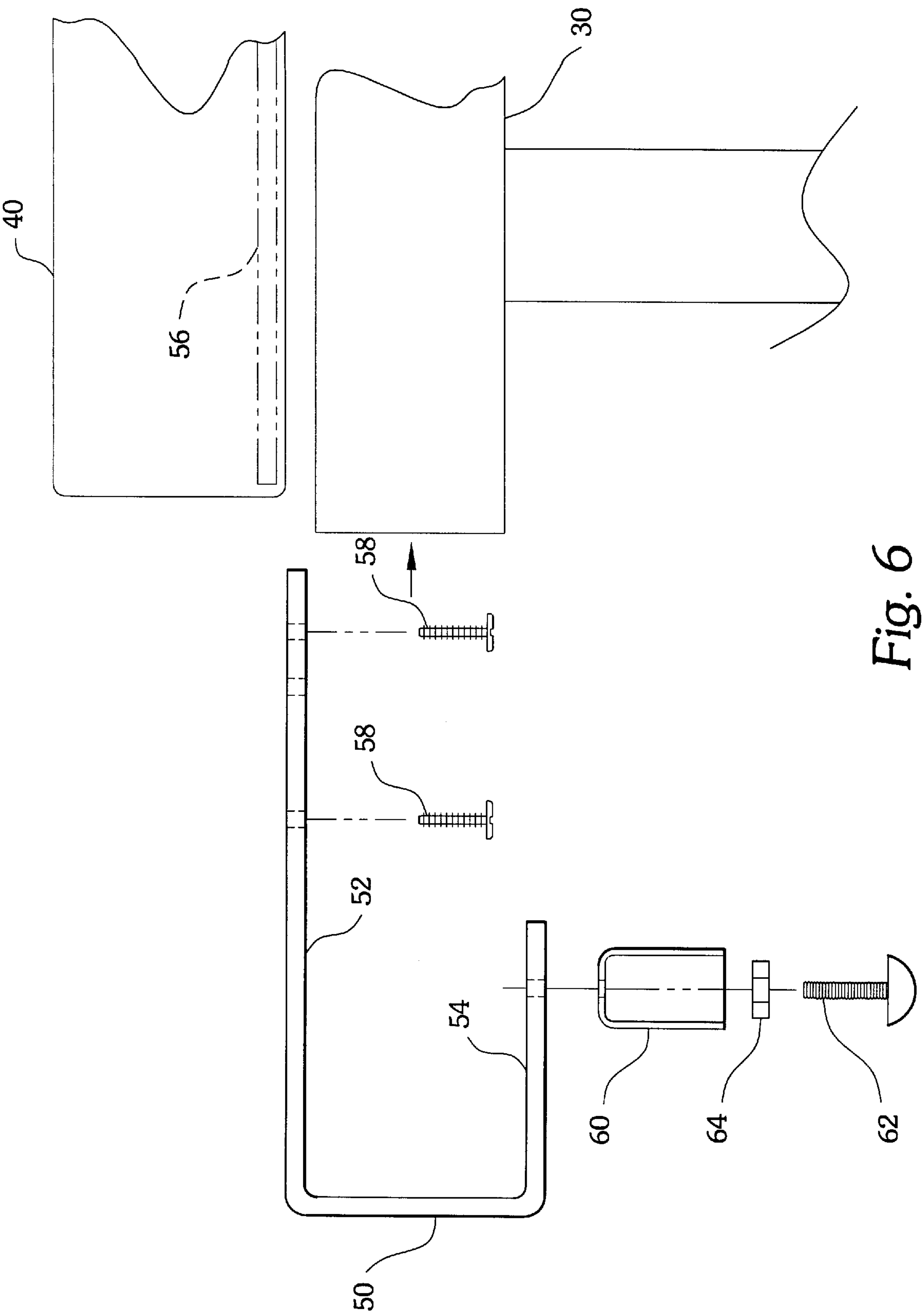
FIG. 6 is an exploded side view of the theft clamping device shown in FIG. 5.
Figure 7:
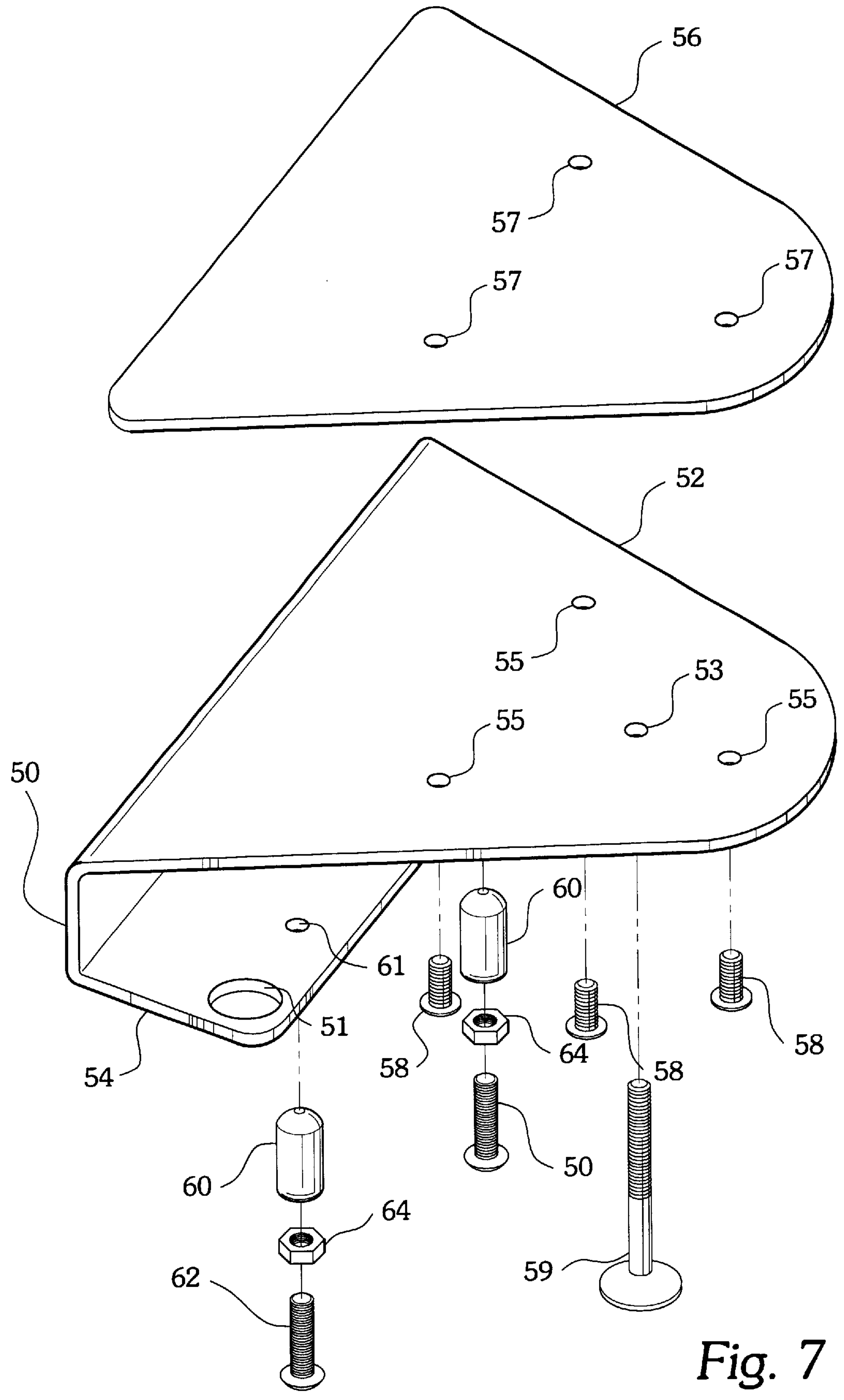
FIG. 7 is an exploded top perspective view of the theft clamping device shown in FIG. 5.

A second type of the theft prevention clamp 50 is shown in FIGS. 5–7. As with the first type of theft prevention device shown in FIGS. 1–4, the second type of theft prevention device 50 has three rigid portions including two rigid portions interconnected by a third rigid portion. Preferably, the three rigid portions are formed from material such as plastic, firm rubber, metal, or the like. The theft prevention clamp 50 may be rigidly configured in the form of one unitary member, wherein two rigid portions 52,54 are parallel to one another and are interconnected by at perpendicularly oriented third rigid portion. The theft prevention clamp 50 may also be configured in the form of three rigid portions interconnected by elements which bias the three rigid portions in a substantially flat orientation. Such elements may be well known springs or hinges or the like. Preferably, the lower rigid portion 54 additionally includes at least one passage hole 51 to enable a user to pass a security cable (not shown) through the hole 51, thereby enabling the user to protectively secure an article to the theft prevention clamp 50. In addition, the upper rigid portion 52 may additionally include a threaded passage hole 53 to enable the user to utilize the article 40 in an upright position via a threaded support means 59 when the clamp 10 is not being employed to secure an article to the support 30. In association with this theft prevention clamp 50 there is also included a fourth rigid portion 56 which is intended to be mounted in or on the article to be protected.

As shown in FIGS. 5–7, the theft prevention clamp 50 includes a plurality of fastening elements for fastening the clamp 50 to the article 40 to be protected and for securely fastening the clamp 50 to the support 30. The fastening elements for fastening the clamp 50 to the article 40 include a plurality of threaded elements 58, such as screws or the like. These fastening elements fasten the clamp 50 to the article to be protected by passing them through holes 55 in the upper rigid portion 52 of the clamp 50 and threading them through threaded holes 57 in the fourth rigid portion 56. The fastening elements for securely fastening the clamp 50 to the support 30 include threaded bolt means 62, threaded nut means 64, and sleeve means 60. Each threaded bolt means 62 has a head which is configured to fit within the sleeve means 60 with a minimum amount of passageway between the threaded bolt means 62 and the sleeve means 60. The head of the threaded bolt means 62 includes a particular securement means indentation for cooperation with an appropriately configured releasing tool or key element (not shown).

Figure 8:
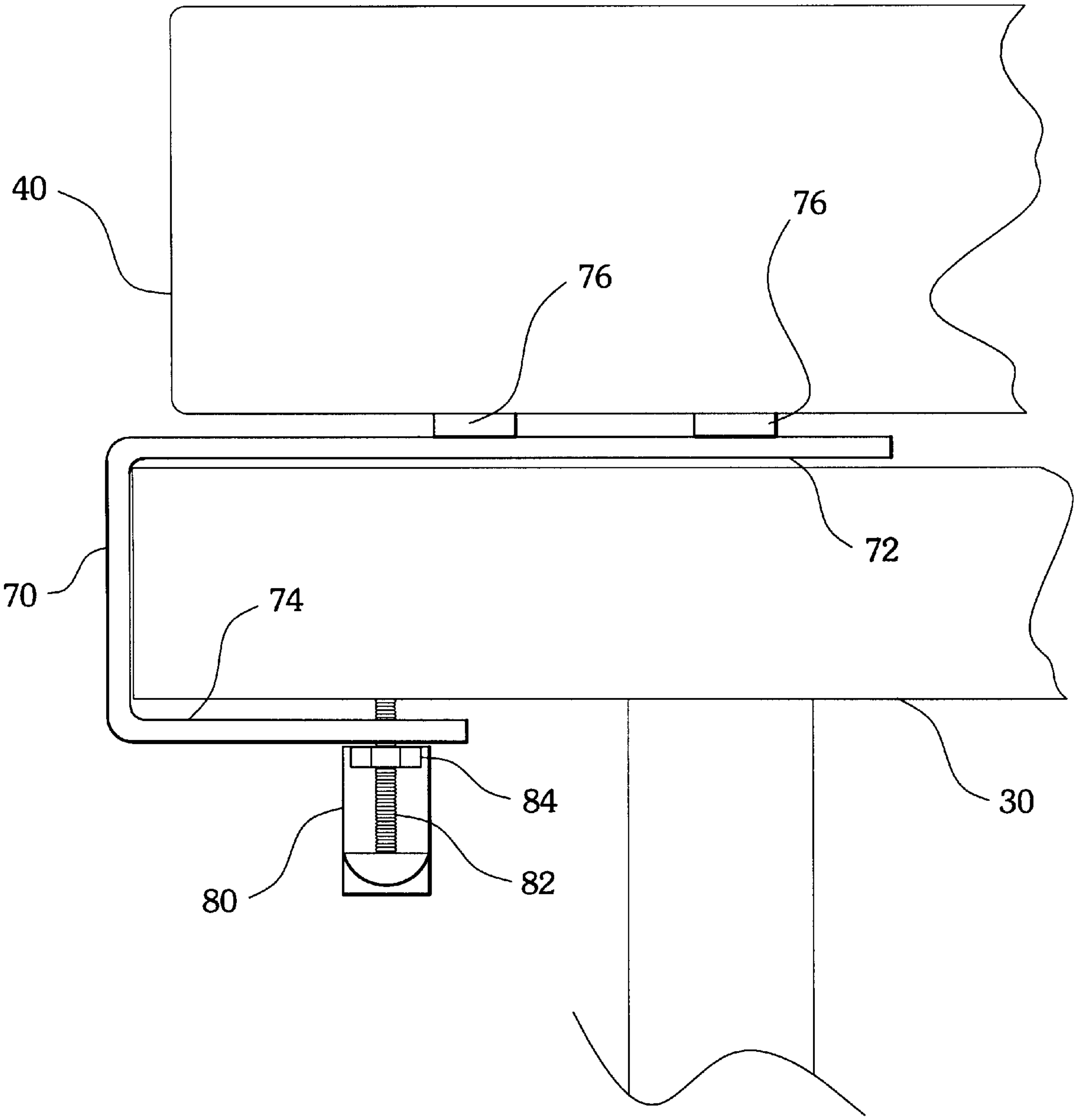
FIG. 8 is a side view of a third type of theft clamping device.
Figure 9:
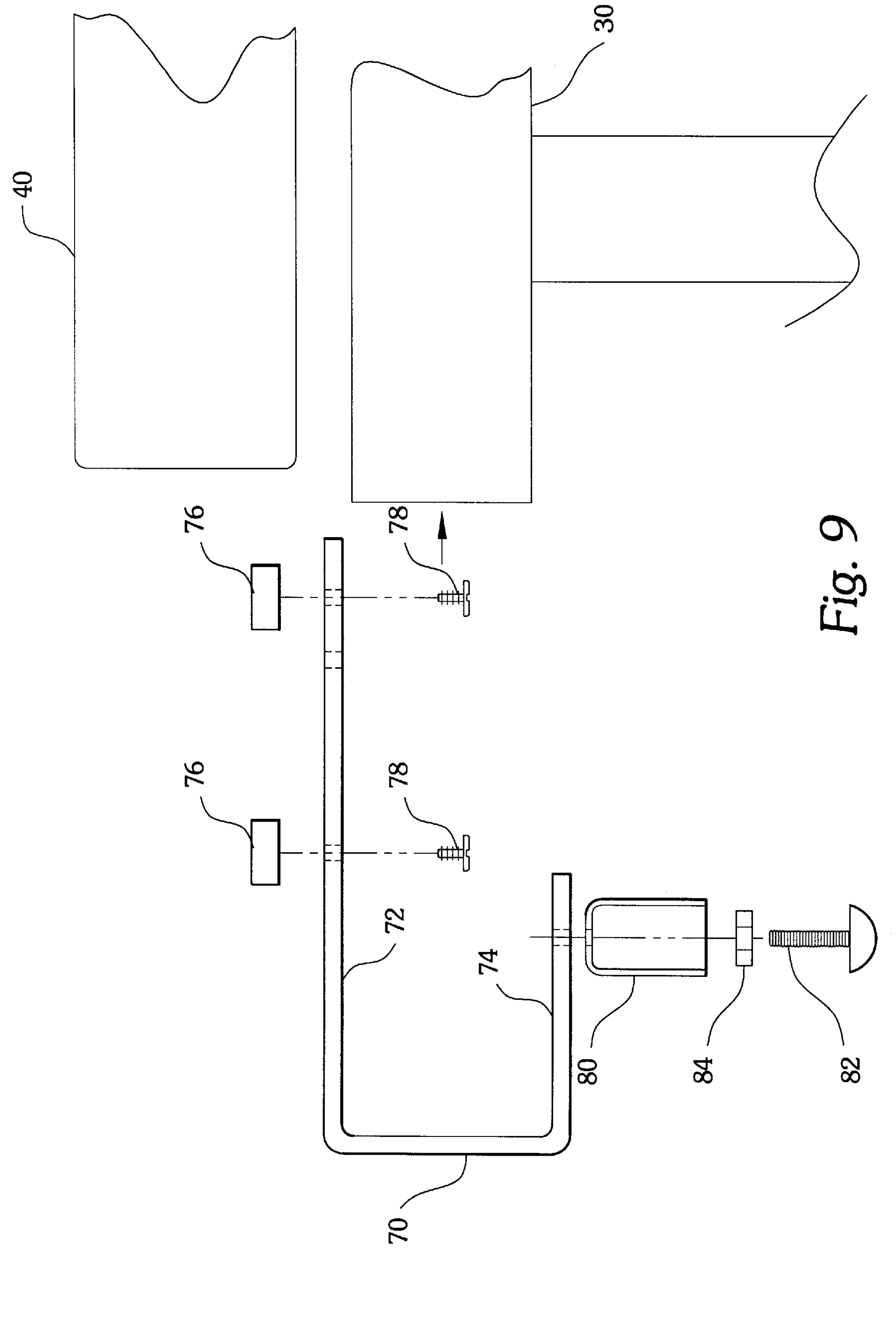
FIG. 9 is an exploded side view of the theft clamping device shown in FIG. 8.
Figure 10:
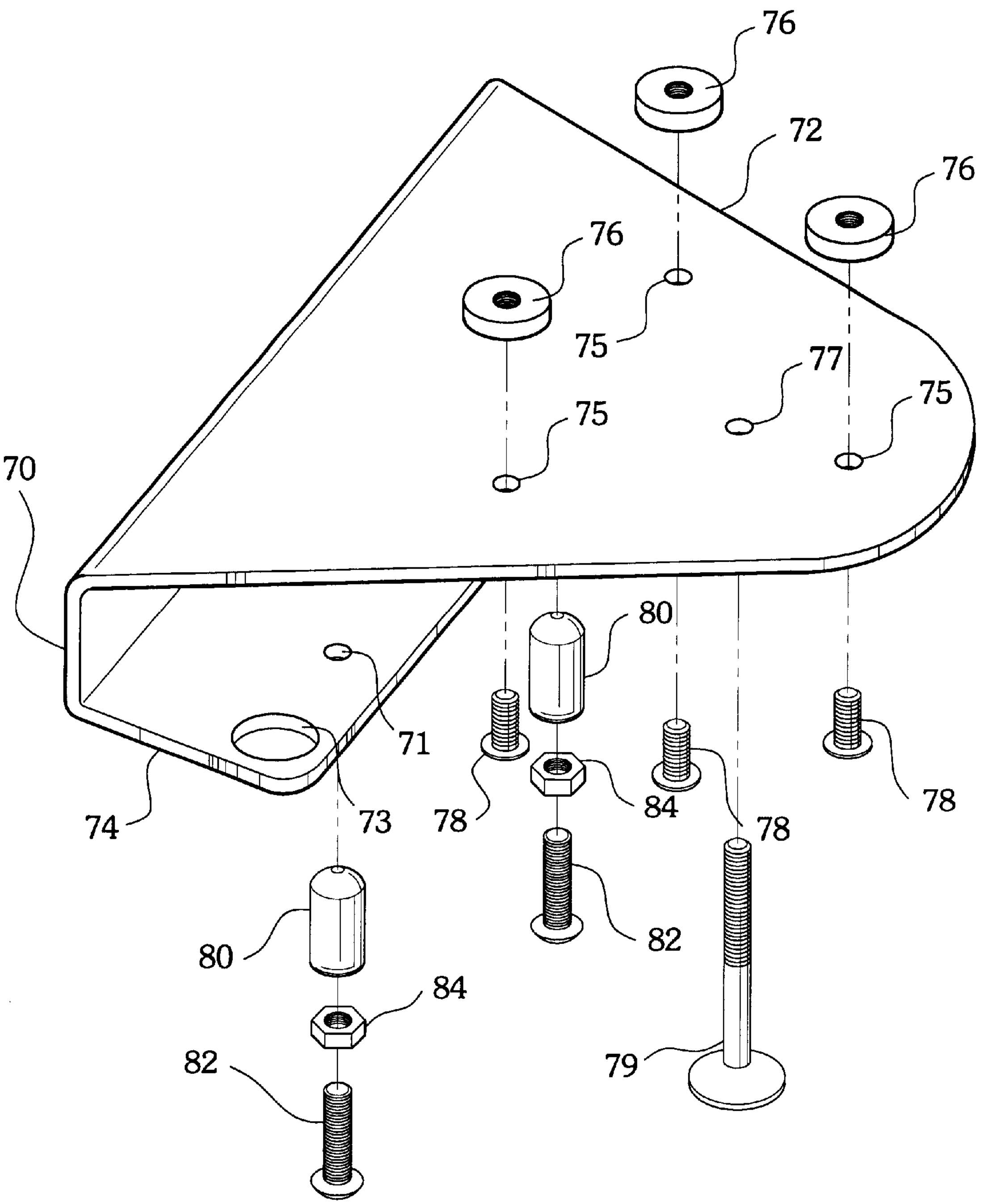
FIG. 10 is an exploded top perspective view of the theft clamping device shown in FIG. 8.

A third type of the theft prevention clamp 70 is shown in FIGS. 8–10. As with the first type of theft prevention device shown in FIGS. 1–4, the third type of theft prevention device 70 has three rigid portions including two rigid portions interconnected by a third rigid portion. Preferably, the three rigid portions are formed from material such as plastic, firm rubber, metal, or the like. The theft prevention clamp 70 may be rigidly configured in the form of one unitary member, wherein two rigid portions 72,74 are parallel to one another and are interconnected by a perpendicularly oriented third rigid portion. The theft prevention clamp 70 may also be configured in the form of three rigid portions interconnected by elements which bias the three rigid portions in a substantially flat orientation. Such elements may be well known springs or hinges or the like. Preferably, the lower rigid portion 74 additionally includes at least one passage hole 73 to enable a user to pass a security cable (not shown) through the hole 73, thereby enabling the user to protectively secure an article to the theft prevention clamp 70. In addition, the upper rigid portion 72 may additionally include a threaded passage hole 77 to enable the user to utilize the article 40 in an upright position via a threaded support means 79 when the clamp 70 is not being employed to secure an article to the support 30.

As shown in FIGS. 8–10, the theft prevention clamp 70 includes a plurality of fastening elements for fastening the clamp 70 to the article 40 to be protected and for securely fastening the clamp 70 to the support 30. The fastening elements for fastening the clamp 70 to the article 40 may include a plurality of threaded elements, such as short screws, bolts, or the like, for securing the clamp 10 directly to the article to be protected. The fastening elements for fastening the clamp 70 to the article 40 may alternatively include a plurality of threaded elements 78, such as short screws or the like, and an equal plurality of threaded receivers or pads 76. The threaded elements 78 are used to secure the threaded receivers or pads 76 to the clamp 70. When the receivers or pads 76 are secured to the clamp 70, fastening material, such as epoxy glue or the like, is poured onto the top of each threaded receiver or pad 76. These threaded receivers or pads 76 are then secured to the article 40 to be protected. Such fastening elements for fastening the clamp 70 to the article 40 may be eliminated by merely applying fastening material, such as epoxy glue or the like, directly to the top of the clamp 70 and then securing the clamp 70 to the article to be protected. The fastening elements for securely fastening the clamp 70 to the support 30 include threaded bolt means 82, threaded nut means 84, and sleeve means 80. Each threaded bolt means 82 has a head which is configured to fit within the sleeve means 80 with a minimum amount of passageway between the threaded bolt means 82 and the sleeve means 80. The head of the threaded bolt means 82 includes a particular securement means indentation for cooperation with an appropriately configured releasing tool or key element (not shown).

Figure 11:
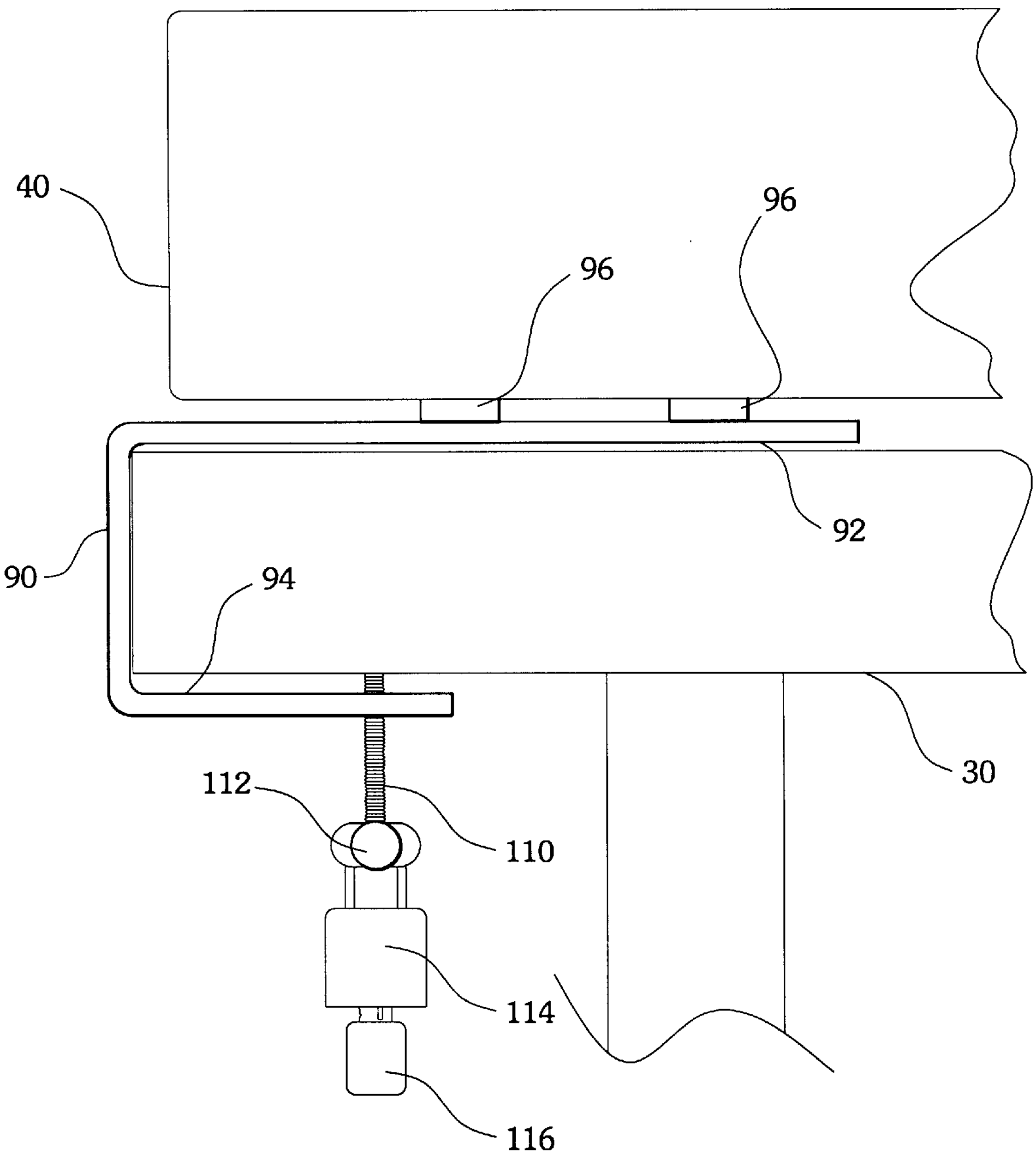
FIG. 11 is a side view of a fourth type of theft clamping device.
Figure 12:
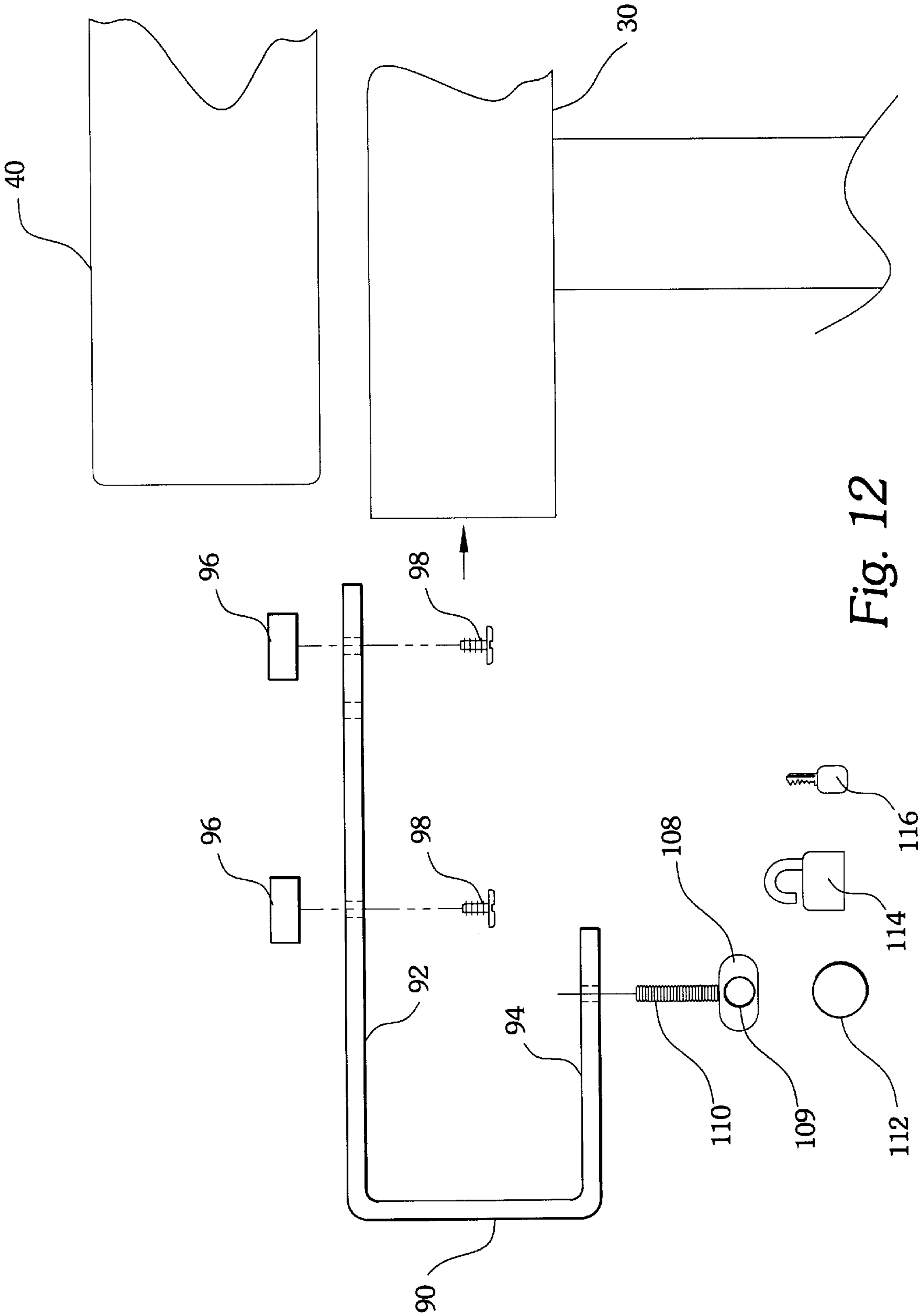
FIG. 12 is an exploded side view of the theft clamping device shown in FIG. 11.
Figure 13:
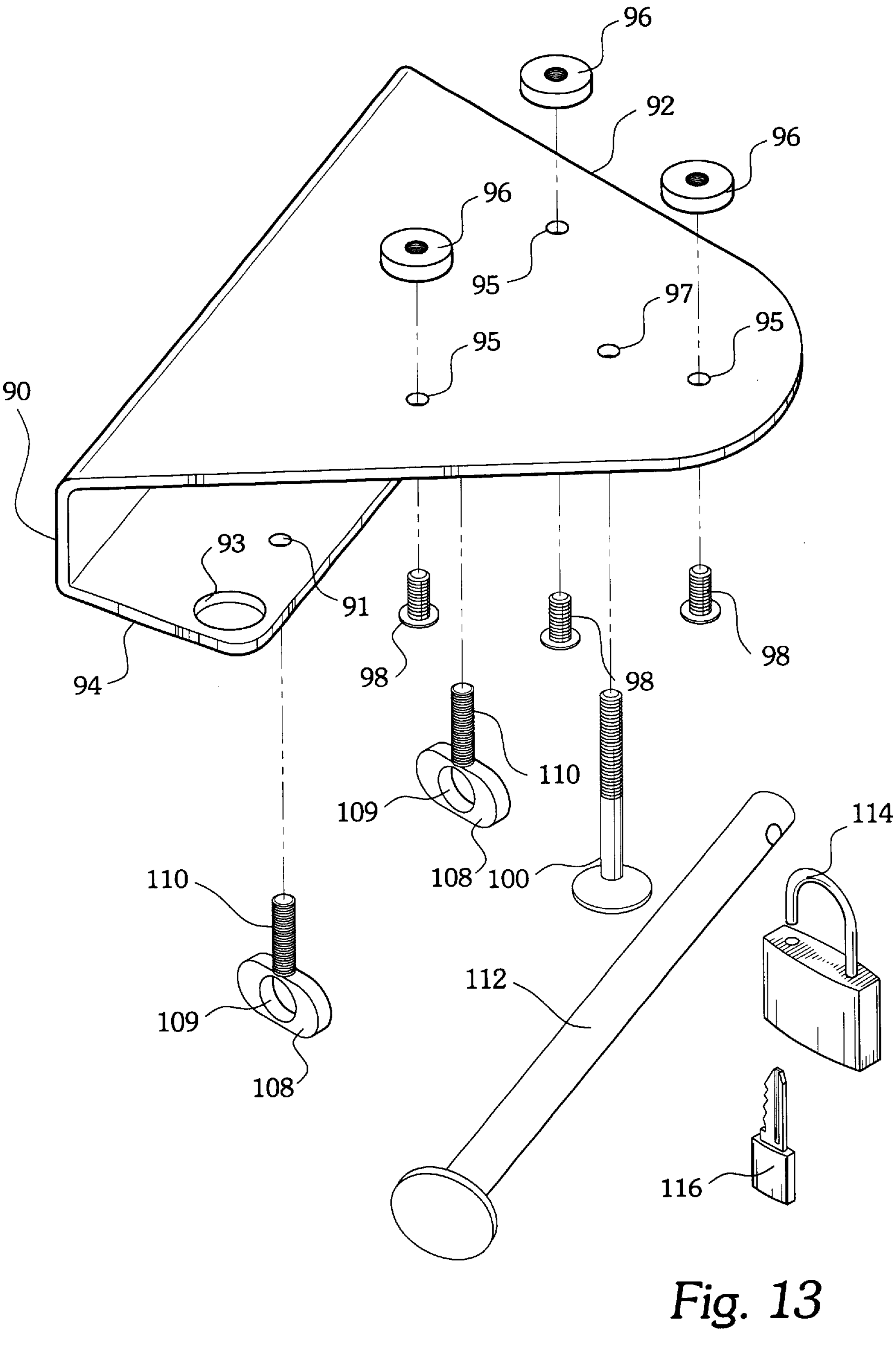
FIG. 13 is an exploded top perspective view of the theft clamping device shown in FIG. 11.

A fourth type of the theft prevention clamp 90 is shown in FIGS. 11–13. As with the first type of theft prevention device shown in FIGS. 1–4, the fourth type of theft prevention device 90 has three rigid portions including two rigid portions interconnected by a third rigid portion. Preferably, the three rigid portions are formed from material such as plastic, firm rubber, metal, or the like. The theft prevention clamp 90 may be rigidly configured in the form of one unitary member, wherein two rigid portions 92,94 are parallel to one another and are interconnected by a perpendicularly oriented third rigid portion. The theft prevention clamp 90 may also be configured in the form of three rigid portions interconnected by elements which bias the three rigid portions in a substantially flat orientation. Such elements may be well known springs or hinges or the like. Preferably, the lower rigid portion 94 additionally includes at least one passage hole 93 to enable a user to pass a security cable (not shown) through the hole 93, thereby enabling the user to protectively secure an article to the theft prevention clamp 90. In addition, the upper rigid portion 92 may additionally include a threaded passage hole 97 to enable the user to utilize the article 40 in an upright position via a threaded support means 100 when the clamp 90 is not being employed to secure an article to the support 30.

As shown in FIGS. 11–13, the theft prevention clamp 90 includes a plurality of fastening elements for fastening the clamp 90 to the article 40 to be protected and for securely fastening the clamp 90 to the support 30. The fastening elements; for fastening the clamp 90 to the article 40 may include a plurality of threaded elements, such as short screws, bolts, or the like, for securing the clamp 90 directly to the article to be protected. The fastening elements for fastening the clamp 90 to the article 40 may alternatively include a plurality of threaded elements 98, such as short screws or the like, and an equal plurality of threaded receivers or pads 96. The threaded elements 98 are used to secure the threaded receivers or pads 96 to the clamp 90. When the receivers or pads 96 are secured to the clamp 90, fastening material, such as epoxy glue or the like, is poured onto the top of each threaded receiver or pad 96. These threaded receivers or pads 96 are then secured to the article 40 to be protected. Such fastening elements for fastening the clamp 90 to the article 40 may be eliminated by merely applying fastening material, such as epoxy glue or the like, directly to the top of the clamp 90 and then securing the clamp 90 to the article 40 to be protected.

The fastening elements for securely fastening the clamp 90 to the support 30 may include threaded bolt means, threaded nut means, and sleeve means, as described above. However, as shown in FIG. 13, the fastening elements may alternatively include threaded members 110, bar means 112, lock means 114, and key means 116. Each threaded member 110 has a head 108 which includes a passage hole 109 enabling passage of bar means 112. The user securely attaches the clamp 90 to the support 30 by rotating the head 108 of each threaded member 110 until securement is obtained. The user then orients the holes 109 of each threaded member 110 to enable passage of the bar means 112 through each hole 109. Once the bar means 112 is passed through each hole 109, the user applies lock means 114 through a hole at the end of the bar means 112 and locks the lock means 114, thereby precluding unauthorized release of the theft prevention clamp 90 from the support 30. The bar means may alternatively not include a hole, as shown in FIG. 13, and may be secured by lock means of the slide lock type (not shown), as well known in the locking art, that may be slid onto the end of the bar means and locked onto the bar means by key means so as to prevent removal of the bar means. Authorized release of the theft prevention clamp 90 from the support occurs via release of the lock means 114 from the bar means 112 via key means 116. Obviously, these types of fastening elements may alternatively be employed for securely fastening the clamps to the supports shown in FIGS. 2–10.

It is to be understood that the present invention is not limited to the embodiments described above, but encompasses any and all embodiments within the scope of the following claims.

What is claimed is:

1. A theft prevention device for preventing the theft of an article from a support comprising:

a substantially J-shaped clamp including, a first rigid portion having a predetermined first length and a plurality of holes defined therein;

a second rigid portion parallel to said first rigid portion, said second rigid portion having a predetermined second length and a plurality of holes defined therein, said predetermined second length being shorter than said predetermined first length; and, a third rigid portion perpendicularly oriented to and interconnecting said first and second rigid portions, said third rigid portion having a predetermined third length;

first fastening means for fastening said clamp to the article to be protected, said first fastening means being configured for passing through said holes of said first rigid portion in a predetermined direction; and, second fastening means for securing said clamp to the support, said second fastening means being configured for passing through said holes of said second rigid portion in the same direction as said first fastening means passes through said holes of said first rigid portion.

2. The theft prevention device according to claim 1, wherein said first fastening means comprise fastening material.

3. The theft prevention according to claim 2, wherein said fastening material is epoxy glue.

4. The theft prevention device according to claim 2, wherein said first fastening means further comprise a plurality of screws and an equal plurality of threaded receivers or pads.

5. The theft prevention device according to claim 1, wherein said three rigid portions are rigidly configured in the form of one unitary member.

6. The theft prevention device according to claim 1, wherein said three rigid portions are configured in the form of three rigid portions interconnected by elements which bias said three rigid portions in a substantially flat orientation.

7. The theft prevention device according to claim 1, further comprising a fourth rigid portion.

8. The theft prevention device according to claim 1, wherein said second fastening means comprise:

a plurality of threaded members each having a head;

a plurality of bolts equal in number to the plurality of threaded members; and, a plurality of sleeves equal in number to the plurality of threaded members.

9. The theft prevention device according to claim 8, wherein the head of a threaded member is configured to fit within one of said sleeves with an amount of passageway between the threaded member and said one of said sleeves.

10. The theft prevention device according to claim 8, wherein the heads of said threaded members are each configured with a particular securement means indentation for cooperation with an appropriately configured releasing tool element.

11. The theft prevention device according to claim 1, wherein said second fastening means comprise:

a plurality of threaded members each having a head;

a bar; and, means for locking; and, a key.

12. The theft prevention device according to claim 11, wherein said heads each include a passage hole enabling passage of said bar.

13. The theft prevention device according to claim 11, wherein said bar includes a hole enabling passage of said means for locking.

14. The theft prevention device according to claim 11, wherein said means for locking is a slide lock.

15. A theft prevention clamp according to claim 1, wherein said three rigid portions are formed of plastic.

16. A theft prevention clamp according to claim 1, wherein said three rigid portions are formed of rubber.

17. A theft prevention clamp according to claim 1, wherein said three rigid portions are formed of metal.

* * * * *